US010562337B2

(12) United States Patent
Naya

(10) Patent No.: US 10,562,337 B2
(45) Date of Patent: Feb. 18, 2020

(54) AUTOGRAPH SUPPORT DEVICE

(71) Applicant: FUJIFILM Corporation, Tokyo (JP)

(72) Inventor: Masayuki Naya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 252 days.

(21) Appl. No.: 15/661,729

(22) Filed: Jul. 27, 2017

(65) Prior Publication Data

US 2017/0320353 A1 Nov. 9, 2017

Related U.S. Application Data

(63) Continuation of application No. PCT/JP2016/000347, filed on Jan. 25, 2016.

(30) Foreign Application Priority Data

Jan. 29, 2015 (JP) ................................ 2015-014920

(51) Int. Cl.
*G09B 11/00* (2006.01)
*B43L 5/00* (2006.01)
*B43L 13/10* (2006.01)
*B43L 13/02* (2006.01)

(52) U.S. Cl.
CPC ............... *B43L 5/00* (2013.01); *B43L 13/026* (2013.01); *B43L 13/10* (2013.01)

(58) Field of Classification Search
USPC .......... 434/81, 85, 88, 89, 92, 162–165, 303
See application file for complete search history.

(56) References Cited

U.S. PATENT DOCUMENTS 1,111,608 A * 9/1914 O'Brien ................ G09B 11/06 359/447
1,420,491 A * 6/1922 Morse ..................... B43L 13/18 144/245.3
1,518,680 A * 12/1924 Arnot ...................... B43L 13/18 359/872
2,387,021 A * 10/1945 Hendershot ............ B43L 13/18 359/449

(Continued)

OTHER PUBLICATIONS

International Search Report for PCT/JP2016/000347 (PCT/ISA/210) dated May 31, 2016.

(Continued)

*Primary Examiner* — Kurt Fernstrom
(74) *Attorney, Agent, or Firm* — Birch, Stewart, Kolasch & Birch, LLP

(57) ABSTRACT

The autograph support device includes a supporting member that supports an image carrier having a planar image display surface such that the image display surface that displays a mirror-image image of an image displayed on a planar writing surface is located one side of the normal direction of the writing surface of a writing medium having the writing surface, and a half mirror that is arranged between the writing surface and the image display surface to reflect at least a portion of light from the one side of the nomal direction of the writing surface above and allow a portion of the light to be transmitted therethrough, and the image display surface and the writing surface are arranged at an equal optical distance with a planar mirror surface of the half mirror interposed therebetween.

13 Claims, 7 Drawing Sheets

(56) References Cited

U.S. PATENT DOCUMENTS

| | | | | | |
|---|---|---|---|---|---|
| 4,464,118 | A * | 8/1984 | Scott | G09B 11/00 434/159 |
| 5,671,091 | A * | 9/1997 | Monroe | G02B 27/022 108/10 |
| 5,751,477 | A * | 5/1998 | Tomita | B43L 13/18 359/447 |
| 6,579,099 | B1 * | 6/2003 | Pipes, Jr. | G09B 11/04 33/1 K |
| 6,810,591 | B2 * | 11/2004 | D'Estais | B43L 13/18 33/1 K |
| 7,775,799 | B2 * | 8/2010 | Reiber | G09B 25/08 434/303 |
| 9,521,276 | B2 * | 12/2016 | Short | H04N 1/00267 |

OTHER PUBLICATIONS

Sota Nakajima, et al., "Support System for Pen or Pencil Using Projector", Heisei No. 21, Research Presentation, Student Association of Tokyo Brach, The Institute of Electronics, Information and Communication Engineers, Lecture No. 161, 2010, 1 page.

Written Opinion of the International Searching Authority for PCT/JP2016/000347 (PCT/ISA/237) dated May 31, 2016.

International Preliminary Report on Patentability and English Translation of Written Opinion of the International Searching Authority for PCT/JP2016/000347, dated Aug. 1, 2017 (Forms PCT/IB/373 and PCT/ISA/237).

* cited by examiner

AUTOGRAPH SUPPORT DEVICE

CROSS-REFERENCE TO RELATED APPLICATIONS

This application is a continuation application of International Application No. PCT/JP2016/000347 filed Jan. 25, 2016, which claims priority under 35 U.S.C. § 119(a) to Japanese Patent Application No. 2015-014920, filed Jan. 29, 2015. Each of the above applications is hereby expressly incorporated by reference, in its entirety, into the present application.

BACKGROUND OF THE INVENTION

1. Field of the Invention

The present invention relates to an autograph support device that performs guiding for preventing collapse of lines or balance when characters are written by hand.

2. Description of the Related Art

In order to prevent collapse of lines or balance when characters are written in a document that needs to be handwritten, a handwriting support system using a projector is suggested in Sota Nakajima, et al; "Support System for Pen or Pencil Using Projector"; Heisei No. 21; Research Presentation, Student Association of Tokyo Brach, The Institute of Electronics, Information and Communication Engineers; Lecture No. 161.

A support system for writing well-balanced beautiful characters by projecting model characters onto paper using a projector to trace the projected characters is suggested in Sota Nakajima, et al; "Support System for Pen or Pencil Using Projector"; Heisei No. 21; Research Presentation, Student Association of Tokyo Brach, The Institute of Electronics, Information and Communication Engineers; Lecture No. 161. Specifically, a target onto which characters are written is imaged by a camera, the image is used to create an image as the target is seen from above, characters are written onto the generated image, using a graphic user interface (GUI), the characters are projected onto the target from the projector, and the projected characters are made to trace.

SUMMARY OF THE INVENTION

However, in a case where the characters are projected by the projector, there is a problem that the projected characters are not easily seen due to the shadow of a hand of a writer who actually writes the characters, and a support function decreases.

The invention has been made in view of the above circumstances, and an object thereof is to provide an autograph support device that enables support of autograph without causing deterioration of a support function by a writer's shadow.

An autograph support device of the invention includes a supporting member that supports an image carrier having a planar image display surface such that the image display surface that displays a mirror-image image of an image displayed on a planar writing surface is located above the writing surface of a writing medium having the writing surface; and a half mirror that is arranged between the writing surface and the image display surface to reflect at least a portion of light from above and allow a portion of the light to be transmitted therethrough.

The image display surface and the writing surface are arranged at an equal optical distance with a planar mirror surface of the half mirror interposed therebetween.

Here, the image display surface and the writing surface being arranged at the equal optical distance with the mirror surface interposed therebetween means that an optical distance from an arbitrary point of the mirror surface to an intersection point between a perpendicular line intersecting the mirror surface at right angles through this arbitrary point and the image display surface, and an optical distance from the arbitrary point to an intersection point between the same perpendicular line and the writing surface are equal to each other.

As long as the image display surface and the writing surface are arranged at the equal optical distance with the mirror surface interposed therebetween, the writing surface, the mirror surface, and the image display surface may be arranged parallel to each other, or the writing surface and the image display surface may be symmetrically arranged at an inclination with respect to the mirror surface.

The mirror-image image of the image displayed on the writing surface is an image obtained by drawing a mirror image observed on the mirror surface when the image displayed on the writing surface is projected on a mirror.

Although the writing medium may be placed on an arbitrary desk or the like, the autograph support device of the invention may include a supporting base that supports the writing medium.

The half mirror may be a half mirror that reflects at least a portion of the light from above and transmits a portion of the light, and may be a half mirror that allows the mirror image of the mirror-image image displayed on the image display surface to be visually recognized when a user sees the half mirror in a range where the reflectivity with respect of light of a visible range is 1% or more and 99% or less and that has the reflectivity and the transmittance such that the lower writing surface can be visually recognized through the half mirror. As long as these conditions are satisfied, the reflectivity in the mirror surface may not be necessarily uniform throughout the entire surface.

In addition, it is preferable that the reflectivity of the mirror surface of the half mirror with respect to light of a visible range is 4% or more and 85% or less.

In addition, here, the wavelength range of the visible range is 380 nm to 780 nm.

Additionally, the mirror surface of the half mirror may not necessarily have the above reflectivity with respect to the entire visible range, and may have the above reflectivity with respect to light of a specific partial wavelength range of the visible range. In that case, the reflectivity of the half mirror with respect to the light of a wavelength range except the specific wavelength range in the visible range is sufficiently smaller than the reflectivity thereof with respect to the light of the specific wavelength range. The "sufficiently small" means the degree such that, when an image formed by the reflection of the light of the specific wavelength range in the mirror surface is visually seen, an image formed by the reflection of light of wavelength ranges other than the specific wavelength range cannot be visually recognized. Specifically, the reflectivity with respect to the light of the specific partial wavelength range of the visible range may be 5 or more times higher than the reflectivity thereof with respect to light of other wavelengths.

It is preferable that the surface of the half mirror that faces the mirror surface is an antireflection surface.

Here, the antireflection surface means one having a sufficiently smaller reflectivity than the reflectivity of the mirror surface, and is not limited to a surface to which an antireflection structure, such as a dielectric multilayer film or a fine irregular structure layer, is applied in order to suppress reflectivity. The "the reflectivity of the antireflection surface is sufficiently small" means reflectivity such that double reflection does not occur due to the image formed by the reflection in the surface that faces the mirror surface, when the image formed by the reflection of the mirror surface is visually recognized.

It is preferable to further include a positional adjustment mark for causing an optical distance between the image display surface and the mirror surface and an optical distance between the writing surface and the mirror surface to coincide with each other.

The supporting member may support the image carrier such that the image display surface of the image carrier is caused to directly face the half mirror or the supporting member may include a transparent supporting plate, and the image carrier may be placed such that the image display surface faces one surface of the transparent supporting plate.

Here, the expression "the image display surface of the image carrier is caused to directly face the half mirror" means that members, such as other supporting plates, are not interposed between the image display surface and the half mirror.

A light source that irradiates the image display surface with illumination light to project the mirror-image image of the image display surface onto the mirror surface may be further included.

The image carrier is not particularly limited if the image carrier has the image display surface. For example, the image carrier may be a sheet having the mirror-image image drawn on one surface thereof, or may be a flat panel display that displays the mirror-image image.

The autograph support device of the invention includes the supporting member that supports the image carrier having the planar image display surface such that the image display surface that displays the mirror-image image of the image displayed on the writing surface is located above the writing surface of the writing medium having the writing surface; and the half mirror that is arranged between the writing surface and the image display surface to reflect at least a portion of the light from above and allow a portion of the light to be transmitted therethrough. The image display surface and the writing surface are configured to be capable of being arranged at an equal optical distance with the planar mirror surface of the half mirror interposed therebetween. Thus, a user of the half mirror who sees the writing surface from above can see a virtual image of the mirror-image image on the writing surface, and even when the user traces the image, the image can be displayed without being shaded by a hand with a writing tool. Since the autograph support device of the invention has a very simple configuration, this autograph support device can be provided at low cost and is excellent in versatility.

DESCRIPTION OF THE PREFERRED EMBODIMENTS

Hereinafter, embodiments of the invention will be described with reference to the drawings.

Figure 1:
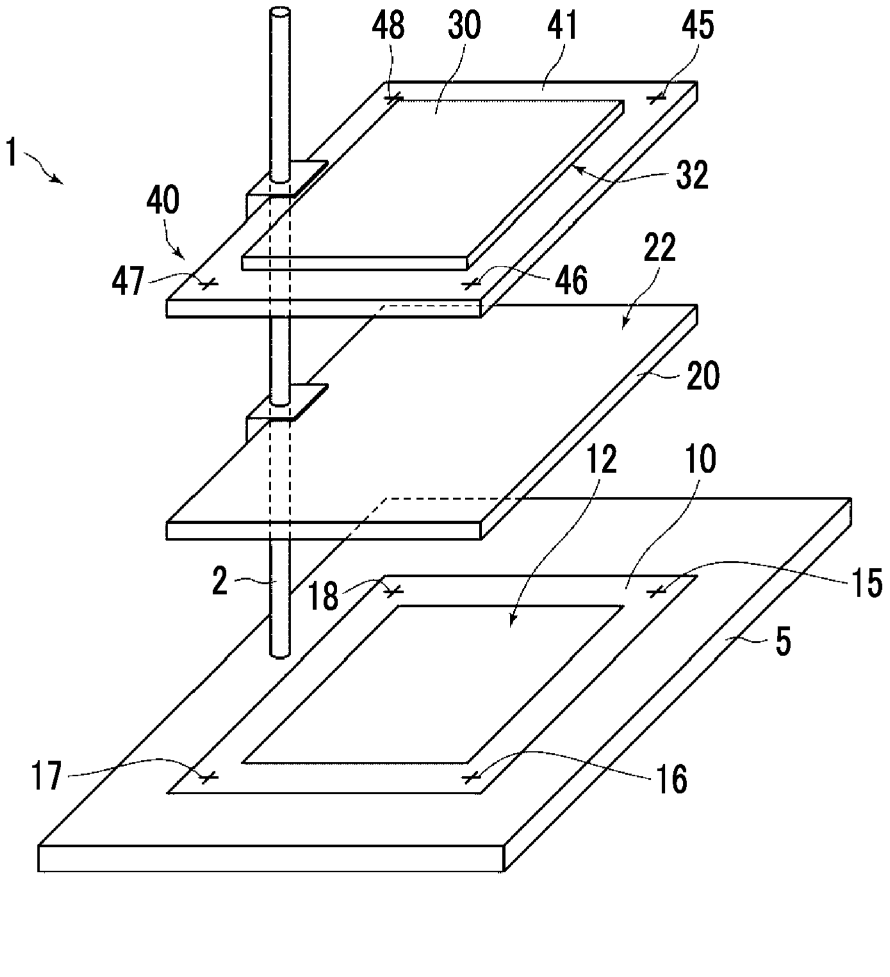
FIG. 1 is a perspective view illustrating a schematic configuration of an autograph support device of a first embodiment of the invention.
Figure 2:
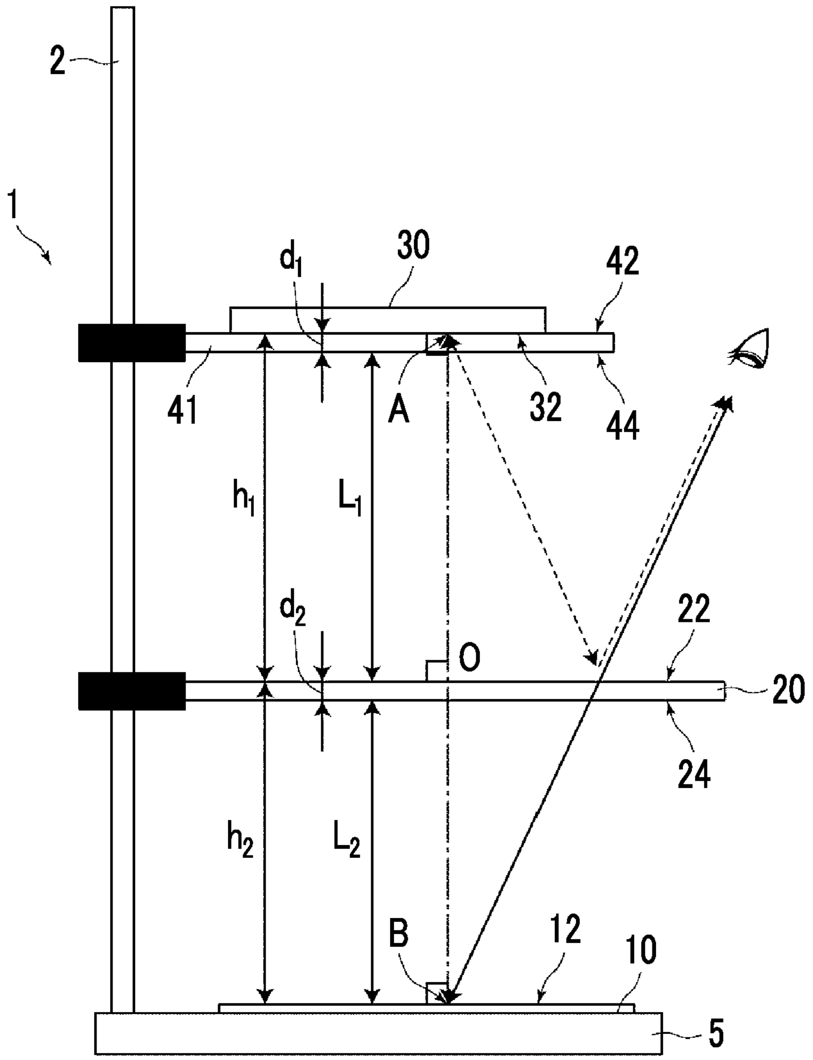
FIG. 2 is a side view illustrating a schematic configuration of the autograph support device illustrated in FIG. 1.

FIG. 1 is a perspective view illustrating a schematic configuration of an autograph support device of an embodiment of the invention, and FIG. 2 is a side view illustrating a positional relationship between a writing surface, a mirror surface, and an image display surface in the autograph support device 1 of the present embodiment.

As illustrated in FIGS. 1 and 2, the autograph support device 1 of the present embodiment includes a supporting member 40 that supports an image carrier 30 having a planar image display surface 32 such that the image display surface 32 that displays a mirror-image image of an image displayed on a planar writing surface 12 is located above the writing surface 12 of a writing medium 10 having the writing surface 12, and a half mirror 20 that is arranged between the writing surface 12 and the image display surface 32 to reflect at least a portion of light from above and allow a portion of the light to be transmitted therethrough, and the image display surface 32 and the writing surface 12 are arranged at an equal optical distance with a planar mirror surface 22 of the half mirror 20 interposed therebetween.

In the present embodiment, the autograph support device 1 includes a supporting base 5 on which the writing medium 10 is placed, and a supporting shaft (supporting rod) 2 for locating the half mirror 20 and the supporting member 40 of the image carrier 30 on the supporting base 5. It is preferable that the half mirror 20 and the supporting member 40 are configured so as to be movable up and down along the supporting shaft 2.

The supporting member 40 of the image carrier 30 includes a supporting plate 41 for placing the image carrier 30. The supporting plate 41 has the transparency such that the image displayed on the image display surface 32 of the image carrier 30 can be copied on the mirror surface 22, and it is preferable that the supporting plate is a transparent substrate of glass, acrylics, or the like which is transparent to visible light. The reflectivity of the front surface of the glass or acrylic plate is about 4%. Since the brightness of the image display surface is reduced by the plate being interposed, it is preferable that both surfaces 42, 44 (refer to FIG. 2) of the supporting plate 41 are subjected to antireflection treatment. It is preferable that the reflectivity of both the surfaces 42, 44 of the supporting plate 41 with respect to the visible light (380 nm to 780 nm) is, for example, less than 1%.

In the present embodiment, the mirror surface 22 of the half mirror 20 is a surface on the image carrier 30 side, and is located such that the writing surface 12, the mirror surface 22, and the image display surface 32 are parallel to each other, and an optical distance $h_1$ between the image display surface 32 and the mirror surface 22 and an optical distance $h_2$ between the mirror surface 22 and the writing surface 12 become equal to each other. That is, the optical distance $h_1$ from an arbitrary point O of the mirror surface 22 to an intersection point A between a perpendicular line intersecting the mirror surface 22 at right angles through this arbitrary point O and the image display surface 32, and the optical distance $h_2$ from the arbitrary point O to an intersection point B between the same perpendicular line and the writing surface 12 are equal to each other.

In the present example, the optical distance $h_1$ between the image display surface 32 and the mirror surface 22 is expressed by a sum of a product $n_1 \cdot d_1$ of a thickness $d_1$ and a refractive index $n_1$ of the supporting plate 41, and a distance $L_1$ between a lower surface 44 of the supporting plate 41, and the mirror surface 22, that is, $h_1=n_1 \cdot d_1+L_1$. Additionally, the optical distance $h_2$ between the mirror surface 22 and the writing surface 12 is expressed by a sum of a product $n_2 \cdot d_2$ of a thickness $d_2$ of the half mirror 20, and a refractive index $n_2$, and a distance $L_2$ between the lower surface 24 of the half mirror 20, and the writing surface 12, that is, $h_2=n_2 \cdot d_2+L_2$.

By adjusting the position of the half mirror 20 and the position of the image carrier 30 such that the above optical distances $h_1$ and $h_2$ become equal to each other, as illustrated in FIG. 2, a mirror image obtained by the mirror-image image displayed on the image display surface 32 of the image carrier 30 being reflected by the mirror surface 22 and visually recognized is seen to coincide with the writing surface 12 when a user has seen the writing surface 12 from above the half mirror 20. In this case, the mirror image of the mirror-image image seems to be directly projected onto the writing surface 12. Actually, the user sees the mirror image of the mirror-image image reflected by the mirror surface 22, and the image is not directly projected onto the writing surface 12 from the image carrier 30. That is, the user visually recognizes a virtual image of the mirror-image image displayed on the image display surface 32 on the writing surface 12.

In addition, in the following, the position of an eye when the users sees the writing surface 12 from above the half mirror 20 is referred to an observation part.

Figure 3:
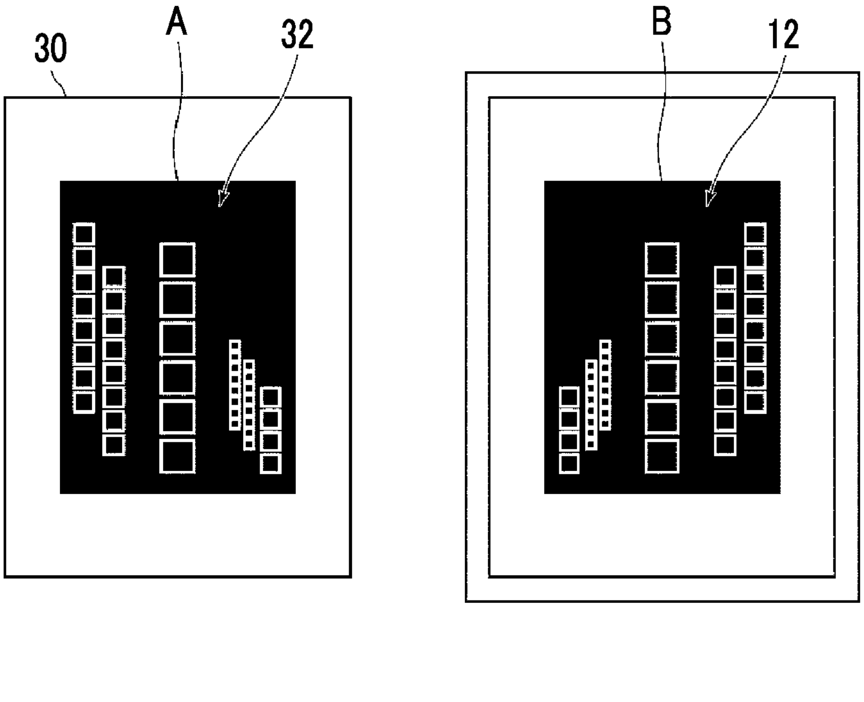
FIG. 3 is a schematic view illustrating an image displayed on an image display surface and a writing surface.

In FIG. 3, a left figure is the mirror-image image A displayed on the image display surface 32 of the image carrier 30, and a right figure is the mirror image of the mirror-image image A that is visually recognized to overlap the writing surface, that is, is an image B to be displayed. The image B illustrated herein represents squares of a region where the address, destination, and the like of a postcard should be written. By writing characters within this displayed squares, well-ordered character strings can be obtained.

The half mirror 20 includes the mirror surface 22, and a surface 24 that faces the mirror surface 22, and is a member in which the mirror surface 22 and its facing surface 24 are arranged parallel to each other. The half mirror 20 may be a half mirror that reflects at least a portion of the light from above and transmits a portion of the light, and as illustrated in FIG. 2, may be a half mirror that allows the writing surface 12 to be visually recognized from the observation part and that has the reflectivity and the transmittance such that the mirror image (the image to be displayed originally) B of the mirror-image image A that is reflected by the half mirror 20 and displayed on the image display surface 32 can be overlappingly displayed on the writing surface 12. Although the reflectivity of the half mirror may be appropriately determined in a range of 1% or more and 99% or less depending on the configuration of an optical system in the autograph support device, it is more preferable that the reflectivity is in a range of 4% or more and 85% or less.

It is preferable that the mirror surface of the half mirror shows the above reflectivity with respect to the entire visible range. However, for example, in a case where a display color of the image display surface is determined in advance with respect to a specific partial wavelength range of the visible range, the mirror surface may show the above reflectivity with respect to the light of a wavelength range of the display color. For example, in a case where an image is displayed with blue light in the image display surface, the mirror surface may reflect only blue wavelength.

It is preferable that the surface 24 that faces the mirror surface 22 of the half mirror 20 is an antireflection surface. The reflectivity of the antireflection surface may be the reflectivity such that an image formed by the reflection on the surface 24 that faces the mirror surface visually recognized from the observation part is not double-reflected on an image formed by the reflection on the mirror surface 22. For example, the reflectivity is less than 0.1 times the reflectivity of the mirror surface 22.

The reflectivity of the antireflection surface with respect to the light of the visible range is preferably less than 1%, and is more preferably 0.5% or less. Such an antireflection surface with a reflectivity of less than 1% can be obtained by well-known antireflection treatment, such as formation of a dielectric multilayer film, or formation of a fine irregular structure layer.

In addition, the reflectivity in the mirror surface 22 and the reflectivity in the surface 24 that faces the mirror surface may not be necessarily uniform throughout the entire surface.

Moreover, in order to make the optical distance $h_1$ between the image display surface 32 and the mirror surface 22 and the optical distance $h_2$ between the writing surface 12 and the mirror surface 22 coincide with each other, positional adjustment marks are provided in the autograph support device 1. Positional adjustment marks 45 to 48 and 15 to 18 of the present embodiment are provided at mutually corresponding positions on a surface including the image display surface 32 and a surface including the writing surface 12. The mutually corresponding positions mean positions that coincide with each other when the surface including the image display surface 32 and the surface including the writing surface 12 are moved in an upward-downward direction as they are and are directly overlapped with each other. In the present embodiment, the positional adjustment marks on the image display surface 32 side are provided on an upper surface 42 of the supporting plate 41 of the supporting member 40 brought into close contact with the image display surface 32. The upper surface 42 of the supporting plate 41 is regarded as the same surface as the image display surface 32. When the positional adjustment marks 45 to 48 on the image display surface side visually recognized from the observation part and the positional adjustment marks 15-18 on the writing surface side overlap each other, respectively, this means that a relation $h_1=h_2$ among the image display surface 32, the writing surface 12, and the mirror surface 22 of the half mirror 20 is satisfied. Thus, the positions of the image display surface 32 and the half mirror 20 may be adjusted using this.

The invention is not limited to an aspect in which the positional adjustment marks on the image display surface side are provided on the upper surface 42 of the supporting plate 41 of the supporting member 40 that becomes the same surface as the image display surface 32 of the image carrier 30, as in the present embodiment, and may be displayed on the image display surface 32 itself of the image carrier 30 together with the mirror-image image.

Additionally, the positional adjustment marks 15 to 18 on the writing surface 12 side may be provided on the supporting base 5 on which the writing medium 10 is placed.

Otherwise, an exclusive sheet provided with the positional adjustment marks 45 to 48 and 15 to 18 may be prepared, and the exclusive sheet may be attached to the image display surface 32 and the writing surface 12 so as to be adjusted.

In addition, even if the positional adjustment marks 45 to 48 and 15 to 18 are not provided, positional adjustment can also be performed while performing observation from the observation part, such that the mirror image of the mirror-image image coincides with the writing surface 12.

The image carrier 30 is not particularly limited if the mirror-image image is displayed on one surface. For example, however, the image carrier may be a sheet having the mirror-image image drawn on one surface thereof, or may be a flat panel display that displays the mirror-image image. The flat panel display may be connected to a separate computer with or without wires, or may be a tablet computer or a smart phone.

The image displayed on the writing surface 12, in the present embodiment includes layout or squares of an address surface (front surface) or a text surface (back surface) of a letter or a postcard, a navigator of a good hand, and a drawing frame, a paperwork guide, or the like, and the image carrier 30 displays the mirror-image image that is an image obtained by drawing the mirror image observed on a mirror surface when these images to be displayed are projected onto a mirror.

The autograph support device of the invention can display layouts or squares on the writing surface, thereby entering well-ordered character strings on a paper surface without lines or squares, can display model characters, thereby using the characters in order to trace the characters and write balanced characters, and can also display a drawing frame, thereby writing illustration or performing painting.

Additionally, the autograph support device of the invention not only can trace displayed characters or picture, but also can display an arrow indicating a place to be written, as a paperwork guide on a documents surface, in a public office, a bank, or the like, and thereby can be used in order to support the paperwork.

Figure 4:
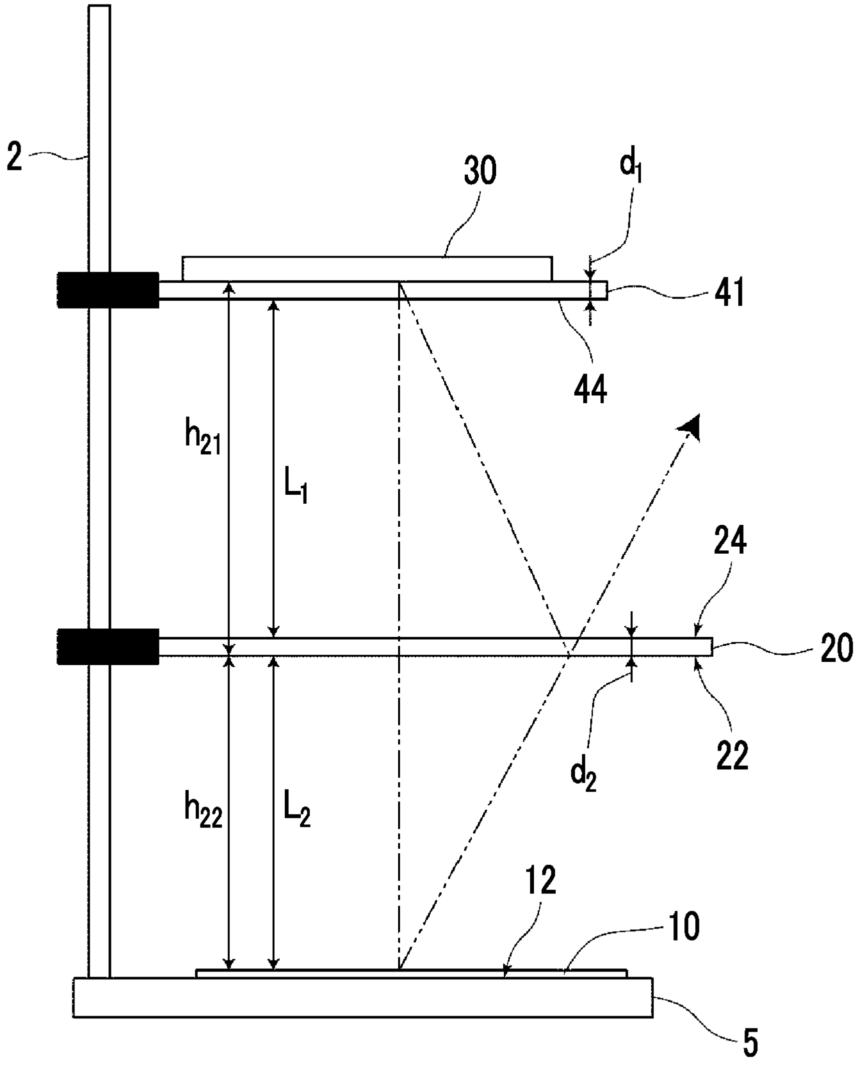
FIG. 4 is a side view illustrating a schematic configuration of an autograph support device of a design change example.

In the above embodiment, the half mirror 20 is used such that the upper surface becomes the mirror surface 22. However, the half mirror may be used such that the mirror surface 22 becomes the lower surface. A side view of an autograph support device of a design change example in which the lower surface is used as the mirror surface 22 is illustrated in FIG. 4. This autograph support device is different from the autograph support device 1 illustrated in FIG. 1 in that the upper and lower surfaces of the half mirror 20 are reversed, that is, the mirror surface 22 of the half mirror 20 becomes the writing surface 12 side. Also, positioning is made such that an optical distance $h_{21}$ between the image display surface 32 and the mirror surface 22 and an optical distance $h_{22}$ between the mirror surface 22 and the writing surface 12 become equal to each other.

In the present example, the optical distance $h_{21}$ between the image display surface 32 and the mirror surface 22 is expressed by a sum of the product $n_1 \cdot d_1$ of the thickness $d_1$ and the refractive index $n_1$ of the supporting plate 41, the distance $L_1$ between the lower surface 44 of the supporting plate 41 and the surface 24 that faces the mirror surface 22 of the half mirror 20, and a product $n_2 \cdot d_2$ of the thickness $d_2$ and the refractive index $n_2$ of the half mirror 20, that is, $h_{21}=n_1 \cdot d_1+L_1+n_2 \cdot d_2$. Also, the optical distance $h_{22}$ between the mirror surface 22 and the writing surface 12 is expressed by the distance $L_2$ between both the surfaces, that is, $h_{22}=L_2$.

By adjusting the position of the half mirror 20 and the position of the image carrier 30 such that the above optical distances $h_{21}$ and $h_{22}$ become equal to each other, a mirror image obtained by the mirror-image image displayed on the image display surface 32 of the image carrier 30 from the observation part being reflected by the mirror surface 22 and visually recognized is seen to coincide with the writing surface 12.

Figure 5:
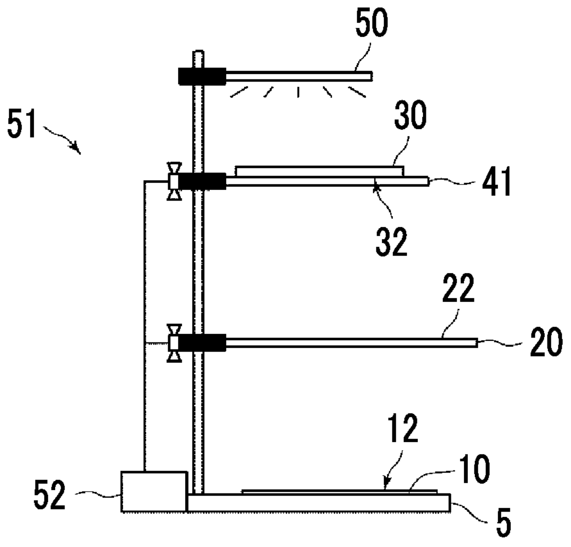
FIG. 5 is a side view illustrating a schematic configuration of an autograph support device of a second embodiment of the invention.

FIG. 5 is a side view illustrating a schematic configuration of an autograph support device 51 of a second embodiment of the invention. The autograph support device 51 of the second embodiment further includes a light source 50, which irradiates the image display surface 32 with illumination light and projects the mirror-image image of the image display surface 32 onto the mirror surface 22, in the autograph support device 1 of the first embodiment. An image can be brightly projected onto the mirror surface 22 by irradiating the image display surface 32 with illumination light particularly in a case where the image carrier's 30 does not display light emission, but is a carrier, such as paper on a front surface of which the image is drawn. In the present example, the sheet-like image carrier 30 is configured so as to be irradiated with illumination light from a back surface side of the image display surface 32. However, the image carrier may be configured so as to be irradiated with illumination light from a front surface (a lower surface in the drawing) side of the image display surface 32.

Moreover, the present autograph support device 51 includes a moving mechanism 52 that moves the half mirror 20 and the image display surface 32 with respect to the writing surface 12, maintaining a relation in which the optical distance $h_1$ between the image display surface 32 and the mirror surface 22 and the optical distance $h_2$ between the writing surface 12 and the mirror surface 22 are equal to each other. The moving mechanism 52 is a mechanism including a gear or the like for moving the image display surface 32 such that the movement of the image display surface 32 becomes twice as large as the movement of the mirror surface 22.

Figure 6:
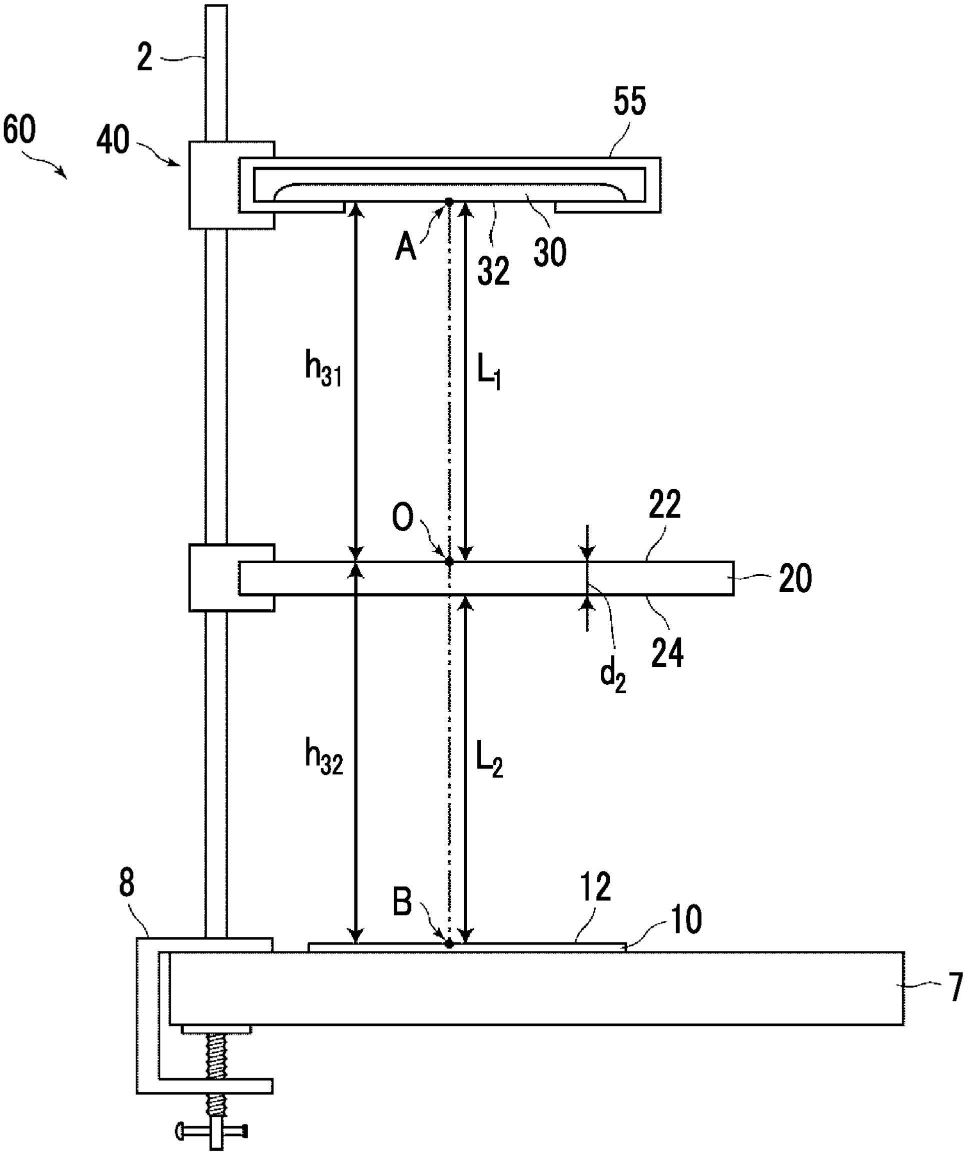
FIG. 6 is a side view illustrating a schematic configuration of an autograph support device of a third embodiment of the invention.

FIG. 6 is a side view illustrating a schematic configuration of an autograph support device 60 of a third embodiment of the invention.

In the autograph support device 1 of the first embodiment, a configuration including the supporting base 5 that supports the writing medium 10 has been described. However, the autograph support device 60 of the present embodiment does not include the supporting base 5. Instead of including the supporting base 5, a bottom part of the supporting shaft 2 includes a vice fixing part 8 for installation in the existing desk, and can be used after the autograph support device 60 is installed by clamping and fixing a top plate 7 of the existing desk with a vice.

Additionally, in the autograph support device 1 of the first embodiment, a configuration in which the supporting member 40 includes the supporting plate 41 on which the image carrier 30 is placed has been described. If a shape such that the image carrier 30 can be supported is provided, the configuration of the supporting member 40 is not limited particularly. In the present embodiment, as illustrated in FIG. 6, an image carrier holder 55 that holds a flat panel display, such as a tablet computer or a smart phone, such that the image display surface 32 directly faces the half mirror 20 is included as the image carrier 30. As illustrated in FIG. 6, the image carrier holder 55 has an opening on at least one side, and is one slidably inserts a tablet computer, a smart phone, or the like through the opening, thereby supporting at least two facing ends from a lower surface. The image carrier holder may be a frame member that supports at least two facing ends of the flat panel display from the lower surface.

Even in a case where nothing is interposed between the image display surface 32 and the mirror surface 22 as in the present embodiment, positioning is made such that an optical distance $h_{31}$ between the image display surface 32 and the mirror surface 22 and an optical distance $h_{32}$ between the mirror surface 22 and the writing surface 12 become equal to each other.

In the present example, the optical distance $h_{31}$ between the image display surface 32 and the mirror surface 22 is the distance $L_1$ between the image display surface 32 and the mirror surface 22, that is, $h_{31}=L_1$, and the optical distance $h_{32}$ between the mirror surface 22 and the writing surface 12 is expressed by a sum of the product $n_2 \cdot d_2$ of the thickness $d_2$ of the half mirror 20, and the refractive index $n_2$, and the distance $L_2$ between the surface 24 that faces the mirror surface 22, and the writing surface 12, that is, $h_{32}=n_2 \cdot d_2+L_2$.

By adjusting the position of the half mirror 20 and the position of the image carrier 30 such that the above optical distances $h_{31}$ and $h_{32}$ become equal to each other, a mirror image obtained by the mirror-image image displayed on the image display surface 32 of the image carrier 30 from the observation part being reflected by the mirror surface 22 and visually recognized is seen to coincide with the writing surface 12.

Figure 7:
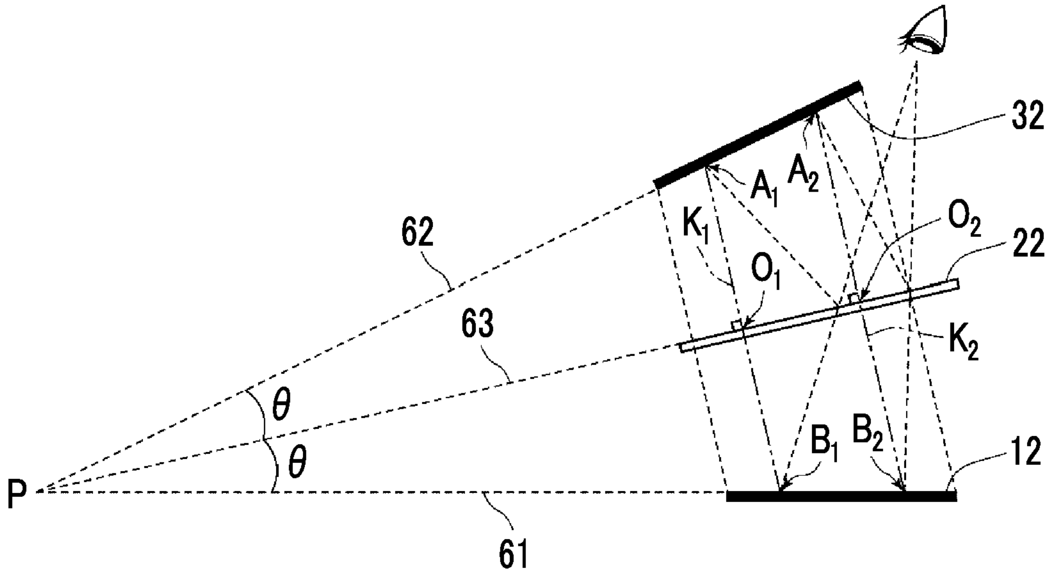
FIG. 7 is a schematic view illustrating another example of the arrangement of the image display surface, a mirror surface, and a writing surface in the autograph support device of the invention.

A positional relationship along the image display surface, the mirror surface, and the writing surface is not limited to a configuration in which these surfaces are parallel to each other as illustrated in the previous embodiments. FIG. 7 is a schematic view illustrating another example of the arrangement of the image display surface, the mirror surface, and the writing surface in the autograph support device of the invention.

In FIG. 7, the image display surface 32 and the writing surface 12 are symmetrically arranged at an inclination with respect to the mirror surface 22. However, arrangement is made such that optical distances of corresponding positions of the image display surface 32 and the writing surface 12 with respect to the mirror surface 22 become equal each other. The position of the writing surface 12 corresponding to a predetermined position of the image display surface 32 is a position $B_1$ where one perpendicular line $K_1$ intersects the writing surface 12 at a point $A_1$ where the perpendicular line $K_1$ perpendicular to an arbitrary point $O_1$ of the mirror surface 22 intersects the image display surface 32. The position of the writing surface 12 corresponding to a point $A_2$ where a perpendicular line $K_2$ perpendicular to another arbitrary point $O_2$ of the mirror surface 22 intersects the image display surface 32 is point $B_2$ where the perpendicular line $K_2$ intersects the writing surface 12. When the optical distances of the corresponding positions of the image display surface 32 and the writing surface 12 with respect the mirror surface 22 have the same relationship, Optical distance $A_1O_1$=Optical distance=$B_1O_1$, and Optical distance $A_2O_2$=Optical distance $B_2O_2$ are established.

In the side view illustrating in FIG. 7, if lines on the image display surface 32, the writing surface 12, and the mirror surface 22 are extended, three extension lines intersect each other at one point P. The three extension lines constitute two equal sides of 61, 62 of an isosceles triangle having this point P as a vertex and a median line 63 that equally divides a corner formed by these two sides 61 and 62. Here, a relationship among these three surfaces when presupposing that the optical distance between the image display surface 32 and the mirror surface 22 and the optical distance between the writing surface 12 and the mirror surface 22 are equal to each other is illustrated schematically. If the thickness of the supporting plate of the supporting member or the half mirror is sufficiently small, the optical distance of the thickness of the supporting plate or the half mirror is negligible. However, it is necessary to strictly take an optical distance of equivalent to the thickness of the supporting plate of the supporting member or the half mirror into consideration.

Even in this configuration, the mirror image obtained by the mirror-image image displayed on the image display surface 32 of the image carrier 30 from the observation part being reflected by the mirror surface 22 and visually recognized is seen to coincide with the writing surface 12.

EXPLANATION OF REFERENCES

1, 51, 60: autograph support device
2: supporting shaft
5: supporting base
10: writing medium
12: writing surface
15, 16, 17, 18: positional adjustment mark on writing surface side
20: half mirror
22: mirror surface
24: surface of half mirror that faces mirror surface
30: image carrier
32: image display surface
40: supporting member
41: supporting plate
45, 46, 47, 48: positional adjustment mark on image display surface side
50: light source

What is claimed is:

1. An autograph support device comprising:

a supporting member that supports an image carrier having a planar image display surface such that the image display surface that displays a mirror-image image of an image displayed on a planar writing surface is located in one side of the normal direction of the writing surface of a writing medium having the writing surface; and a half mirror that is arranged between the writing surface and the image display surface to reflect at least a portion of light from the side of the image display surface and allow a portion of the light to be transmitted therethrough, wherein the image display surface and the writing surface are arranged at an equal optical distance with a planar mirror surface of the half mirror interposed therebetween.

2. The autograph support device according to claim 1, wherein the writing surface, the mirror surface, and the image display surface are arranged parallel to each other.

3. The autograph support device according to claim 1, wherein the writing surface and the image display surface are symmetrically arranged at an inclination with respect to the mirror surface.

4. The autograph support device according to claim 1, further comprising:

a supporting base that supports the writing medium.

5. The autograph support device according to claim 1, wherein the reflectivity of the mirror surface of the half mirror with respect to light of a visible range is 4% or more and 85% or less.

6. The autograph support device according to claim 1, wherein the reflectivity of the mirror surface of the half mirror with respect to light of a specific partial wavelength range of a visible range is 5 or more times higher than the reflectivity thereof with respect to light of other wavelengths.

7. The autograph support device according to claim 1, wherein a surface of the half mirror at an opposite side of the half mirror from the mirror surface is an antireflection surface.

8. The autograph support device according to claim 1, further comprising:

a positional adjustment mark for causing an optical distance between the image display surface and the mirror surface and an optical distance between the writing surface and the mirror surface to coincide with each other.

9. The autograph support device according to claim 1, wherein the supporting member supports the image carrier such that the image display surface of the image carrier is caused to directly face the half mirror.

10. The autograph support device according claim 1, wherein the supporting member includes a transparent supporting plate, and the image carrier is placed such that the image display surface faces one surface of the transparent supporting plate.

11. The autograph support device according to claim 1, further comprising:

a light source that irradiates the image display surface with illumination light to project the mirror-image image of the image display surface onto the mirror surface.

12. The autograph support device according to claim 1, wherein the image carrier is a sheet having the mirror-image image drawn on one surface thereof.

13. The autograph support device according to claim 1, wherein the image carrier is a flat panel display that displays the mirror-image image.

* * * * *